United States Patent
Matsuura

(10) Patent No.: US 9,836,932 B2
(45) Date of Patent: Dec. 5, 2017

(54) TECHNIQUES TO EXTEND A DOORBELL CHIME

(71) Applicant: Vivint, Inc., Provo, UT (US)

(72) Inventor: Craig Matsuura, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/064,514

(22) Filed: Mar. 8, 2016

(65) Prior Publication Data
US 2017/0263086 A1    Sep. 14, 2017

(51) Int. Cl.
G08B 23/00    (2006.01)
G08B 7/06    (2006.01)

(52) U.S. Cl.
CPC ...................... *G08B 7/06* (2013.01)

(58) Field of Classification Search
None
See application file for complete search history.

(56) References Cited

U.S. PATENT DOCUMENTS

| | | | |
|---|---|---|---|
| 8,937,659 B1 * | 1/2015 | Scalisi | G08B 3/10 348/143 |
| 9,179,107 B1 | 11/2015 | Scalisi et al. | |
| 9,247,219 B2 * | 1/2016 | Kasmir | G08B 13/19684 |
| 2014/0070922 A1 | 3/2014 | Davis | |

FOREIGN PATENT DOCUMENTS

| | | |
|---|---|---|
| CA | 2704244 A1 | 11/2011 |
| WO | 2012022986 A1 | 2/2012 |

OTHER PUBLICATIONS

Storck, C., "Notifying doorbell with pushingbox," Jul. 1, 2013 (http://makezine.com/projects/notifying-doorbell-with-pushingbox/).

* cited by examiner

*Primary Examiner* — K. Wong
(74) *Attorney, Agent, or Firm* — Holland & Hart LLP

(57) ABSTRACT

Methods, systems, and devices for security and/or automation systems are described. In some embodiments, the methods may include detecting an input at a doorbell, and communicating the detected input to a doorbell signal generating component associated with the doorbell based at least in part on the detecting. The methods may further include generating a first alert at the doorbell signal generating component associated with the doorbell. In some embodiments, the methods may further include communicating the detected input to one or more alert components associated with the security and/or automation system based at least in part on the detecting, and generating a second alert at the one or more alert components associated with the security and/or automation system.

16 Claims, 7 Drawing Sheets

TECHNIQUES TO EXTEND A DOORBELL CHIME

BACKGROUND

The present disclosure, for example, relates to security and/or automation systems, and more particularly to techniques extending a doorbell chime.

Security and automation systems are widely deployed to provide various types of communication and functional features such as monitoring, communication, notification, and/or others. These systems may be capable of supporting communication with a user through a communication connection or a system management action.

Currently, when a visitor depresses the doorbell button, a ring or chime may be emitted from an audio box associated with the doorbell, usually positioned near the front door inside the home. Yet, if the homeowner is located elsewhere inside the home away from the doorbell audio box, he or she may not hear the chime when a visitor comes to the door. There is lacking a means by which the audio chime from the doorbell may be wirelessly communicated to one or more additional locations within the home.

SUMMARY

Current doorbell systems may emit a chime or tone when a visitor rings the bell, alerting the homeowner of the visitor's arrival. Some doorbell chimes may be too quiet to be heard throughout the home, however, while others may be overly loud such as to disturb members of the household. It may be desirable, therefore, to provide techniques for broadcasting the doorbell chime to one or more additional locations throughout the home.

A method of security and/or automation systems is described. The method may include detecting an input at a doorbell, communicating the detected input to a doorbell signal generating component associated with the doorbell based at least in part on the detecting, generating a first alert at the doorbell signal generating component associated with the doorbell, communicating the detected input to one or more alert components associated with the security and/or automation system based at least in part on the detecting and generating a second alert at the one or more alert components associated with the security and/or automation system.

The one or more alert components may be any device associated with the security and/or automation system that includes a speaker or other alert component. For example, the one or more alert component may be a camera positioned somewhere in the home, linked with the home security system. In other examples, the one or more alert component may be a control panel associated with the home automation and/or security system. In still other examples, the one or more alert component may be a homeowner's personal smartphone or other computing device. Regardless of the form taken by the one or more alert component, the alert component need not be connected via a wired connection with the doorbell itself, or with the signal generating component associated with the doorbell. Nor does the alert component require any additional hardware or hardwiring. Instead, the alert component may receive a wireless signal from the doorbell upon detecting an input at the doorbell, and may broadcast the alert at the second alert component accordingly.

Although typical doorbell systems may utilize audio alerts, the one or more alert component of the present invention may utilize various other forms of doorbell alerts, which may be the same as or different from the form of doorbell alerts emitted from the primary doorbell alert system. For example, the doorbell itself may emit an auditory chime upon visitor depression of the doorbell button, while the one or more alert component, such as a control panel, may display a text message notifying the homeowners that a visitor has approached the door. In other examples, the primary doorbell unit may cause a light to turn on or flash, while the one or more alert component, such as a homeowner's smartphone, may provide a haptic alert, such as a vibration, to notify the homeowner that a visitor has approached. Other combinations of visual, auditory, and/or haptic alerts are also envisioned.

An apparatus for security and/or automation systems is described. The apparatus may include means for detecting an input at a doorbell, means for communicating the detected input to a doorbell signal generating component associated with the doorbell based at least in part on the detecting, means for generating a first alert at the doorbell signal generating component associated with the doorbell, means for communicating the detected input to one or more alert components associated with the security and/or automation system based at least in part on the detecting and means for generating a second alert at the one or more alert components associated with the security and/or automation system.

A further apparatus is described. The apparatus may include a processor, memory in electronic communication with the processor, and instructions stored in the memory. The instructions may be operable to cause the processor to detect an input at a doorbell, communicate the detected input to a doorbell signal generating component associated with the doorbell based at least in part on the detecting, generate a first alert at the doorbell signal generating component associated with the doorbell, communicate the detected input to one or more alert components associated with the security and/or automation system based at least in part on the detecting and generate a second alert at the one or more alert components associated with the security and/or automation system.

A non-transitory computer readable medium for security and/or automation systems is described. The non-transitory computer-readable medium may include instructions to cause a processor to detect an input at a doorbell, communicate the detected input to a doorbell signal generating component associated with the doorbell based on the detecting, generate a first alert at the doorbell signal generating component associated with the doorbell, communicate the detected input to one or more alert components associated with the security and/or automation system based on the detecting and generate a second alert at the one or more alert components associated with the security and/or automation system.

Some examples of the method, apparatus, or non-transitory computer-readable medium described above may further include processes, features, means, or instructions for broadcasting the detected input at the doorbell wirelessly to the one or more alert components associated with the security and/or automation system.

Some examples of the method, apparatus, or non-transitory computer-readable medium described above may further include processes, features, means, or instructions for generating the first alert and the second alert simultaneously or in series.

In some examples of the method, apparatus, or non-transitory computer-readable medium described above, the first alert and the second alert each include any of a visual alert, or an auditory alert, or a haptic alert, or a combination thereof.

In some examples of the method, apparatus, or non-transitory computer-readable medium described above, the one or more component associated with the security and/or automation system includes any of a control panel, or a camera, or a combination thereof.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein including their organization and method of operation together with associated advantages will be better understood from the following description when considered in connection with the accompanying figures. Each of the figures is provided for the purpose of illustration and description only, and not as a definition of the limits of the claims.

A further understanding of the nature and advantages of the present disclosure may be realized by reference to the preceding drawings. In the appended figures, similar components or features may have the same reference label. Further, various components of the same type may be distinguished by following a first reference label with a dash and a second label that may distinguish among the similar components. However, features discussed for various components including those having a dash and a second reference label apply to other similar components. If only the first reference label is used in the specification, the description is applicable to any one of the similar components having the same first reference label irrespective of the second reference label.

DETAILED DESCRIPTION

Systems and methods for extending a doorbell chime are described. While known doorbell systems may provide audio or other notification of a visitor's presence locally at an alert component associated with the doorbell, usually positioned near the front door, there is a need for a system whereby the visitor's presence may be communicated to additional locations in the home via components of a home automation system.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
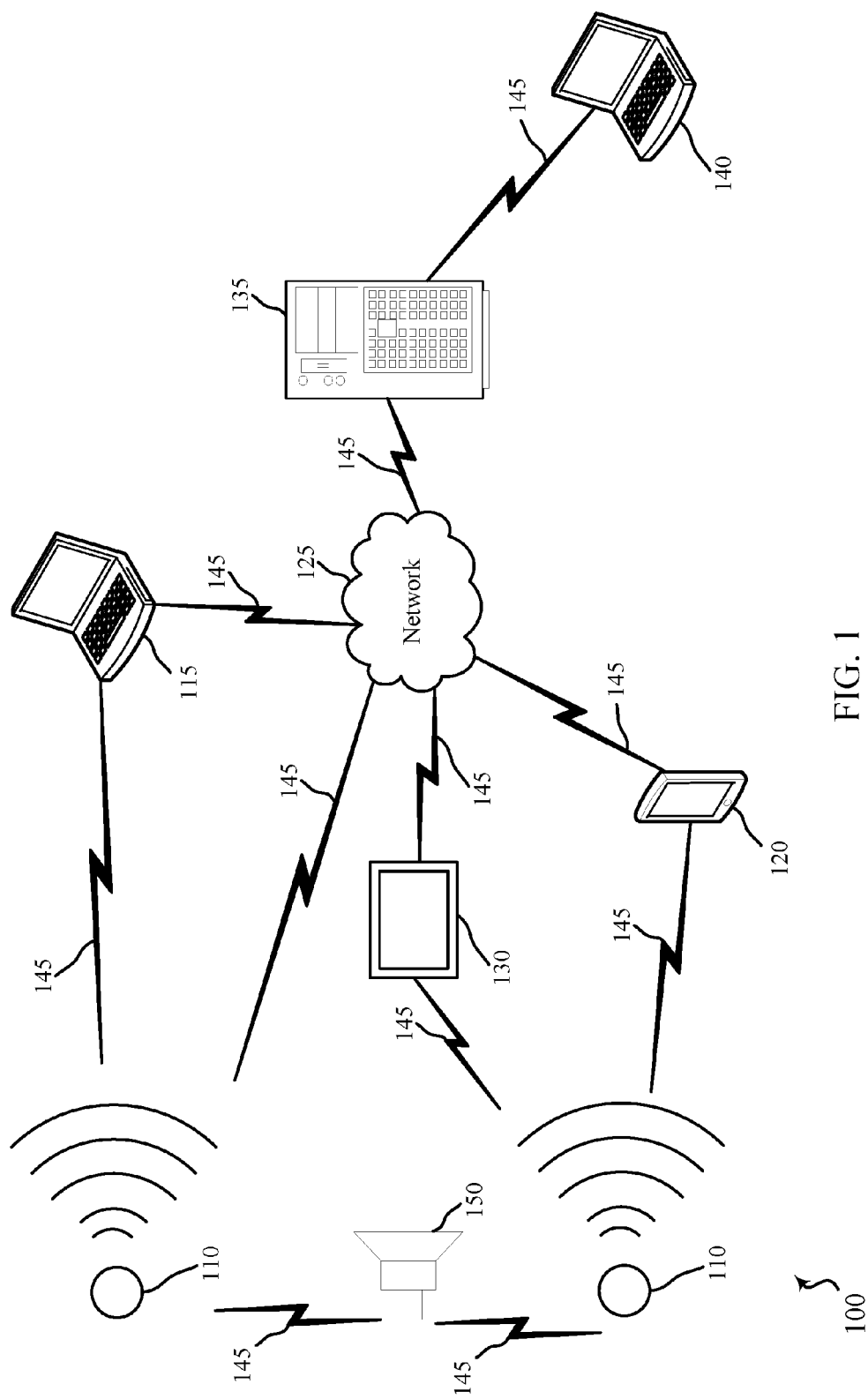
FIG. 1 illustrates an example of a communication system that supports extending a doorbell chime in accordance with aspects of the present disclosure.

FIG. 1 is an example of a security and/or automation system 100 in accordance with various aspects of this disclosure. In some embodiments, the security and/or automation system 100 may include one or more sensor units 110, local computing device 115, 120, network 125, server 135, control panel 130, remote computing device 140, and doorbell signal generating component 150. One or more sensor units 110 may communicate via wired or wireless communication links 145 with one or more of the local computing device 115, 120, network 125, or doorbell signal generating component 150. The network 125 may communicate via wired or wireless communication links 145 with the control panel 130 and the remote computing device 140 via server 135. In alternate embodiments, the network 125 may be integrated with any one of the local computing device 115, 120, server 135, or remote computing device 140, such that separate components are not required.

Local computing device 115, 120 and remote computing device 140 may be custom computing entities configured to interact with one or more sensor units 110 via network 125, and in some embodiments, via server 135. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smartphone, a mobile phone, a personal digital assistant (PDA), a smartwatch, a wearable electronic device, and/or any other suitable device operable to send and receive signals, store and retrieve data, and/or execute modules. In some examples, local computing device 115, 120 may include an alert component, such as a speaker unit, visual display unit, and/or haptic alert unit configured to communicate a doorbell event.

Control panel 130 may be a smart home system panel such as, for example, an interactive panel mounted on a wall in an occupant's home. Control panel 130 may be in direct communication via wired or wireless communication links 145 with the one or more sensor units 110, or may receive sensor data from the one or more sensor units 110 via local computing devices 115, 120 and network 125, or may receive data via remote computing device 140, server 135, and network 125. In some examples, control panel 130 may include an alert component, such as a speaker unit, visual display unit, and/or haptic alert unit configured to communicate a doorbell event.

The local computing devices 115, 120 may include memory, a processor, an output, a data input, and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from one or more sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile (haptic) output device, and/or the like. In some embodiments, the output may be an integral component of the local computing devices 115, 120. Similarly stated, the output may be directly coupled to the processor. For example, the output may be the integral display of a tablet and/or smartphone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to monitor the output of the sensor units 110. The remote computing device 140 may be functionally and/or structurally similar to the local computing devices 115, 120 and may be operable to receive data streams from and/or send signals to at least one of the one or more sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 135.

In some embodiments, the one or more sensor units 110 may be sensors configured to conduct periodic or ongoing automatic functions (e.g., identifications, determinations, measurements, etc.) associated with detecting a visitor and initiating a doorbell alert. In some examples, the one or more sensor units 110 may be standard doorbell inputs, such as a button or switch associated with an audio and/or visual doorbell alert. In such examples, the one or more sensor unit 110 may detect visitor presence or a doorbell event when the visitor pushes or manipulates the doorbell button or switch associated with the one or more sensor unit 110. In other examples, the one or more sensor unit 110 may be configured to detect visitor presence or a doorbell event using alternate or additional sensor capabilities. For example, each sensor unit 110 may be capable of sensing one or more physiological, audio, video, environmental, wireless signal, and/or motion parameters (among other things) associated with a detected visitor or doorbell event, or alternatively, separate sensor units 110 may monitor separate parameters associated with the detected visitor. For example, one sensor unit 110 may measure audio, for example by detecting the sound of a visitor approaching a front door, and/or the like, while another sensor unit 110 (or, in some embodiments, a different element of the same sensor unit 110) may be a video monitor configured to record visitor approach to a home. In some embodiments, one or more sensor units 110 may additionally monitor alternative parameters associated with the visitor, such as motion, vibration, audio, wireless signals emitted by devices associated with the visitor, and the like.

Visitor input at the doorbell, for example in the form of pushing a button or manipulating a switch in examples where the one or more sensor units 110 are standard doorbell inputs, or in the form of detecting visitor motion or vibration in other examples where the one or more sensor units 110 detect visitor approach, may be communicated to a doorbell signal generating component 150, configured to generate an alert associated with the doorbell, such as an audio and/or visual alert. In some examples, the doorbell signal generating component 150 may be a standard doorbell chime positioned near the front door of a home, configured to emit an audible chime upon depression of a doorbell button by a visitor. In other examples, the doorbell signal generating component 150 may be one or more lights associated with the doorbell and configured to turn on or flash upon manipulation of a doorbell switch by a visitor. Other embodiments and combinations are also envisioned.

Visitor input or data gathered by the one or more sensor units 110 may also be communicated to local computing device 115, 120, which may be, in some embodiments, a thermostat or other wall-mounted input/output smart home display. In other embodiments, local computing device 115, 120 may be a personal computer or a smartphone, among other things. In still other embodiments, local computing device may be any component associated with the home automation system having an alert component, such as a speaker, display screen, haptic alert element, or the like. The local computing device 115, 120 may process the data received from the one or more sensor units 110, or may forward the data directly on to remote computing device 140. In some embodiments, remote computing device 140 may process the data received from the one or more sensor units 110, via network 125 and server 135. Data transmission may occur via, for example, frequencies appropriate for a personal area network (such as BLUETOOTH® or IR communications) or local or wide area network frequencies such as radio frequencies specified by the IEEE 802.15.4 standard, among others.

In some embodiments, local computing device 115, 120 may communicate with remote computing device 140 or control panel 130 via network 125 and server 135. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 135 may be configured to communicate with the one or more sensor units 110, the local computing devices 115, 120, the remote computing device 140, and control panel 130. The server 135 may perform additional processing on signals received from the one or more sensor units 110 or local computing devices 115, 120, or may simply forward the received information to the remote computing device 140 and control panel 130.

Server 135 may be a computing device operable to receive data streams (e.g., from one or more sensor units 110 and/or local computing device 115, 120 or remote computing device 140), store and/or process data, and/or transmit data and/or data summaries (e.g., to remote computing device 140). For example, server 135 may receive a stream of visitor data in the form of audio data from a sensor unit 110, a stream of visitor data from the same or a different sensor unit 110 in the form of motion data, and a stream of doorbell input data from either the same or yet another sensor unit 110. In some embodiments, server 135 may "pull" the data streams, e.g., by querying the sensor units 110, the local computing devices 115, 120, and/or the control panel 130. In some embodiments, the data streams may be "pushed" from the sensor units 110 and/or the local computing devices 115, 120 to the server 135. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 135 may include a database (e.g., in memory) containing audio, video, physiological, occupancy, profile, past monitoring action(s), and/or other data received from the sensor units 110 and/or the local computing devices 115, 120, among other components. Additionally, as described in further detail herein, software (e.g., stored in memory) may be executed on a processor of the server 135. Such software (executed on the processor) may be operable to cause the server 135 to monitor, process, summarize, present, and/or send a signal associated with the detected visitor and/or doorbell event.

Figure 2:
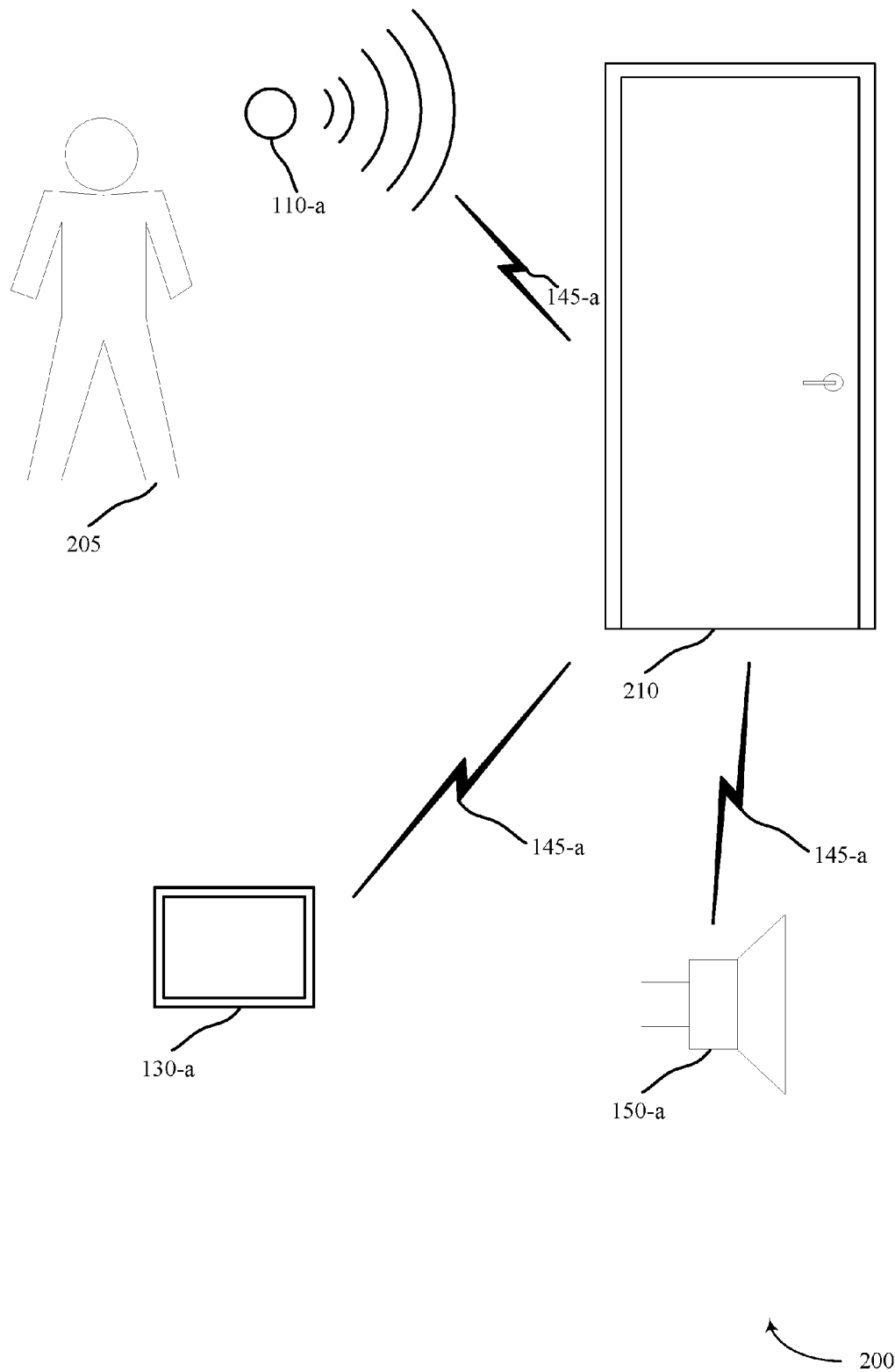
FIG. 2 illustrates an example of a communication system that supports extending a doorbell chime in accordance with aspects of the present disclosure.

FIG. 2 illustrates an example of a security and/or automation system 200 for extending a doorbell chime. Security and/or automation system 200 may include one or more sensor units 110-a, a control panel 130-a, and/or a doorbell signal generating component 150-a, which may be examples of the one or more sensor units 110, control panel 130, and/or doorbell signal generating component 150 described with respect to FIG. 1. In the system 200 illustrated, a visitor 205 may provide some form of input at door 210, as detected by one or more sensor units 110-a. The one or more sensor units 110-a associated with door 210 or the surrounding area may detect the visitor 205 and derive an input based on various detected user inputs. For example, the one or more sensor units 110-a may detect that the visitor 205 directly pushes or manipulates a button or switch associated with a doorbell in some examples, or the one or more sensor units 110-a may detect that the visitor 205 has approached the door based on detecting sound, movement, and/or vibration associated with the visitor's 205 approach. In still other examples, the one or more senor unit 110-a may detect user approach by detecting a wireless signal emitted from a device associated with the visitor 205, such as a smartphone or personal computing device. In any example, the detected visitor 205 approach at the door 210 by one or more sensor unit 110-a may result in data associated with the detected approach being communicated via wired or wireless connection 145-a to one or more of control panel 130-a and/or doorbell signal generating component 150-a.

The detected visitor 205 approach or input at door 210 detected via one or more sensor units 110-a may be communicated to doorbell signal generating component 150-a, such that doorbell signal generating component 150-a may generate a first alert. In some examples, this alert may be a simple auditory doorbell chime, emitted at a doorbell chime unit positioned near door 210. In other examples, the first alert may be a visual alert, such as the turning on or flashing of one or more lights within the home or structure associated with the door 210. The first alert may be generated at one or more than one location within the home or structure.

The detected visitor 205 approach or input at door 210 detected via one or more sensor units 110-a may additionally be communicated to control panel 130-a, or to one or more additional or alternate alert components associated with the security and/or automation system 200. A second alert may be generated as a result of this communicating. For example, the second alert may include an additional auditory, visual, and/or haptic alert generated at one or more alert components associated with the security and/or automation system 200. The one or more alert components may, in some examples, include the control panel 130-a illustrated in FIG. 2, while in other examples, the one or more alert components may include any one or more of a camera or other component of the home automation system capable of generating a visual, auditory, and/or haptic alert. In some examples, the first alert generated at the doorbell signal generating component 150-a and the second alert generated at the one or more component associated with the security and/or automation system 200, such as control panel 130-a, may be generated simultaneously, while in other examples, the first and second alerts may be generated in series. In some examples, the first alert may take the same form as the second alert, such as, for example, an auditory alert, while in other examples, the first alert and the second alert may take different forms, for example, an auditory alert and a visual alert. In some examples, the second alert may include a plurality of alerts of the same or different forms.

The one or more components associated with the security and/or automation system 200 may be positioned throughout the home or other structure such that an occupant within the home may be alerted to the visitor's 205 presence. In some examples, the detected input at the door 210 may be wirelessly broadcasted to a plurality of components associated with the security and/or automation system 200 positioned throughout the home. In some examples, a home occupant may input preferences at control panel 130-a or some other appropriate user interface associated with the home automation and/or security system, indicating the form in and location at which the occupant prefers to receive the first and/or second alerts. For example, a home occupant may indicate particular rooms, at particular times or on particular days, when certain alert components should generate an alert upon detection of a visitor 205. In some examples, alerts may be generated based at least in part on detecting occupancy in various areas of the home or structure, for example using one or more sensor units 110-a, such that alerts are provided only to occupied areas of the home. In still other examples, alerts may be provided only to areas of the home having awake occupants, as opposed to sleeping occupants, as detected by one or more sensor units 110-a, for example using heart rate or respiration rate monitoring.

Figure 3:
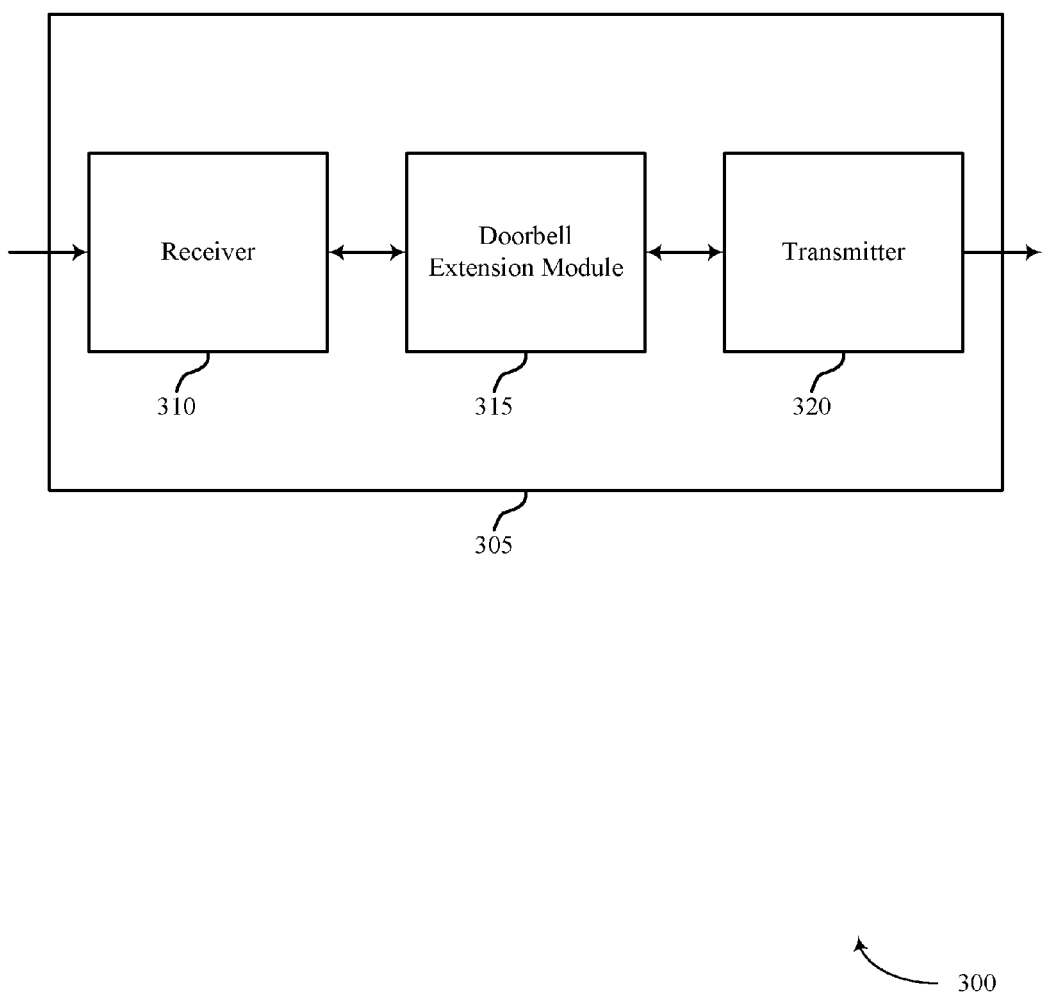
FIGS. 3 and 4 show block diagrams of a device that supports extending a doorbell chime in accordance with aspects of the present disclosure.

FIG. 3 shows a block diagram 300 of an apparatus 305 that supports extending a doorbell chime in accordance with various aspects of the present disclosure. Apparatus 305 may be an example of one or more aspects of a control panel 105, 105-a described with reference to FIGS. 1 and 2, or may be an example of any of one or more sensor units 110, local computing device 115, 120, remote computing device 140, and/or doorbell signal generating component 150 as described with reference to FIG. 1.

The components of apparatus 305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented in whole or in part with instructions embodied in memory formatted to be executed by one or more general and/or application-specific processors. Apparatus 305 may include receiver 310, doorbell extension module 315, and transmitter 320. Apparatus 305 may also include a processor. Each of these components may be in communication with each other.

The receiver 310 may receive information such as packets, user data, or control information associated with various information channels (e.g., control channels, data channels, and information related to extending a doorbell chime, etc.). Information may be passed on to other components of the device. The receiver 310 may be an example of aspects of the transceiver 525 described with reference to FIG. 5.

The doorbell extension module 315 may detect an input at a doorbell, communicate the detected input to a doorbell signal generating component associated with the doorbell based at least in part on the detecting, generate a first alert at the doorbell signal generating component associated with the doorbell, communicate the detected input to one or more alert components associated with the security and/or automation system based at least in part on the detecting, and generate a second alert at the one or more alert components associated with the security and/or automation system. The doorbell extension module 315 may also be an example of aspects of the doorbell extension module 505 described with reference to FIG. 5.

The transmitter 320 may transmit signals received from other components of apparatus 305. In some examples, the transmitter 320 may be collocated with a receiver in a transceiver module. For example, the transmitter 320 may be an example of aspects of the transceiver 525 described with reference to FIG. 5. The transmitter 320 may include a single antenna, or it may include a plurality of antennas.

Figure 4:
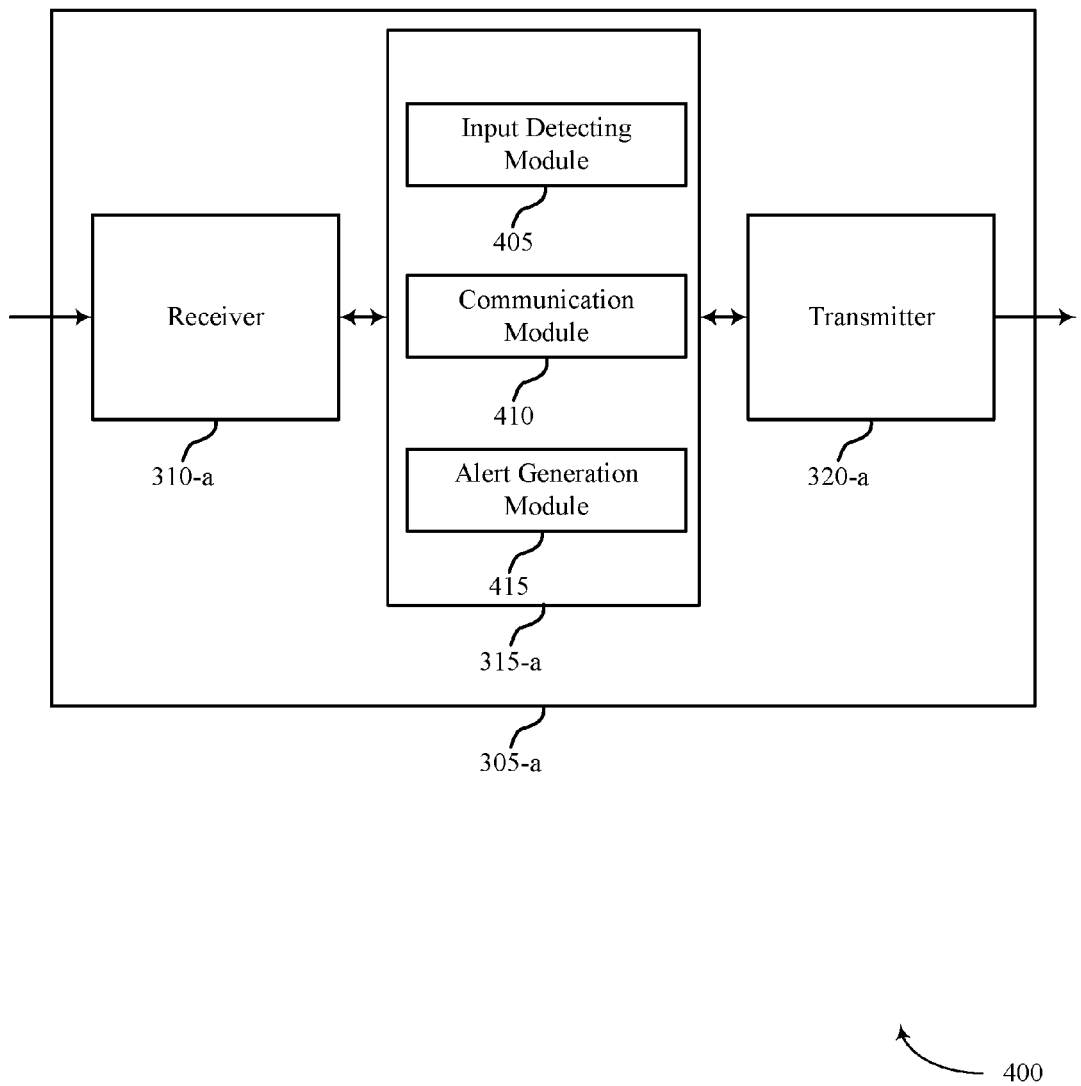

FIG. 4 shows a block diagram 400 of an apparatus 305-*a* that supports extending a doorbell chime in accordance with various aspects of the present disclosure. Apparatus 305-*a* may be an example of aspects of an apparatus 305 or a control panel 130 described with reference to FIGS. 1 and 3. Apparatus 305-*a* may include receiver 310-*a*, doorbell extension module 315-*a*, and transmitter 320-*a*, which may be examples of receiver 310, doorbell extension module 315, and transmitter 320 described with respect to FIG. 3. Apparatus 305-*a* may also include a processor. Each of these components may be in communication with each other.

The receiver 310-*a* may receive information which may be passed on to other components of the device. The receiver 310-*a* may also perform the functions described with reference to the receiver 310 of FIG. 3. The receiver 310-*a* may be an example of aspects of the transceiver 525 described with reference to FIG. 5.

The doorbell extension module 315-*a* may be an example of aspects of doorbell extension module 315 described with reference to FIG. 3. The doorbell extension module 315-*a* may include input detecting module 405, communication module 410, and alert generation module 415. The doorbell extension module 315-*a* may be an example of aspects of the doorbell extension module 505 described with reference to FIG. 5.

The input detecting module 405 may detect an input at a doorbell. The communication module 410 may communicate the detected input to a doorbell signal generating component associated with the doorbell based on the detecting, and communicate the detected input to one or more alert components associated with the security and/or automation system based on the detecting. The alert generation module 415 may generate the first alert and the second alert simultaneously or in series, generate a first alert at the doorbell signal generating component associated with the doorbell, and generate a second alert at the one or more alert components associated with the security and/or automation system. In some cases, the first alert and the second alert each include any of a visual alert, or an auditory alert, or a haptic alert, or a combination thereof. In some cases, the one or more component associated with the security and/or automation system may include any of a control panel, or a camera, or a combination thereof.

The transmitter 320-*a* may transmit signals received from other components of apparatus 305-*a*. In some examples, the transmitter 320-*a* may be collocated with a receiver in a transceiver module. For example, the transmitter 320-*a* may be an example of aspects of the transceiver 525 described with reference to FIG. 5. The transmitter 320-*a* may utilize a single antenna, or it may utilize a plurality of antennas.

Figure 5:
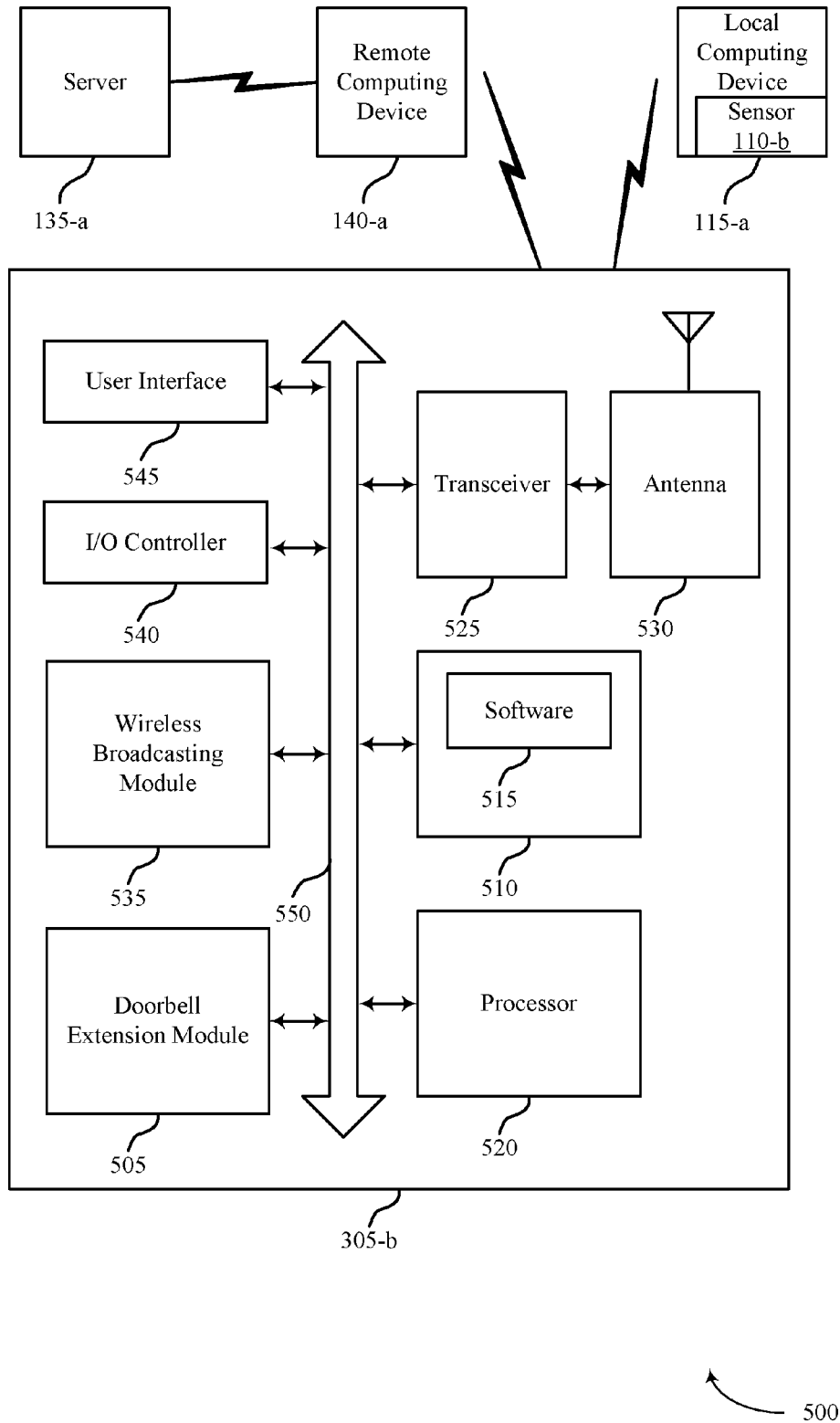
FIG. 5 illustrates a block diagram of a system including a control device that supports extending a doorbell chime in accordance with aspects of the present disclosure.

FIG. 5 shows a diagram of a system 500 including a device that supports extending a doorbell chime in accordance with various aspects of the present disclosure. For example, system 500 may include apparatus 305-*b*, which may be an example of an apparatus 305, 305-*a* as described with reference to FIGS. 3 and 4. In some embodiments, one or more sensors 110-*a* (e.g., motion, proximity, smoke, light, glass break, door, window, carbon monoxide, and/or another sensor) may connect to some element of system 500 via a network using one or more wired and/or wireless connections. One or more buses 550 may allow data communication between one or more elements of apparatus 305-*b*.

Many other devices and/or subsystems may also be connected to or may be included as one or more elements of system 500 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 5 need not be present to practice the present systems and methods. The devices and subsystems can be interconnected in different ways from that shown in FIG. 5. In some embodiments, an aspect of some operation of a system, such as that shown in FIG. 5, may be readily known in the art and are not discussed in detail in this application. Code to implement the present disclosure can be stored in a non-transitory computer-readable medium such as one or more of system memory. The operating system for apparatus 305 or for other devices within system 500 may be iOS, ANDROID, MS-DOS, MS-WINDOWS, OS/2, UNIX, LINUX, or another known operating system.

Apparatus 305-*b* may also include doorbell extension module 505, memory 510, processor 520, transceiver 525, antenna 530, and wireless broadcasting module 535. Each of these modules may communicate, directly or indirectly, with one another (e.g., via one or more buses 550). In some embodiments, the terms "control panel" and "control device" are used synonymously.

The doorbell extension module 505 may be an example of a doorbell extension module as described with reference to FIGS. 3 and 4. In some cases doorbell extension module 505 may be represented as a software module.

The memory 510 may include random access memory (RAM) and read only memory (ROM). The memory 510 may store computer-readable, computer-executable software including instructions that, when executed, cause the processor to perform various functions described herein (e.g., extending a doorbell chime, etc.). In some embodiments, the memory 510 can contain, among other things, the Basic Input-Output system (BIOS) which may control basic hardware and/or software operation such as the interaction with peripheral components or devices. For example, software modules to implement the present systems and methods may be stored within the system memory 510. In some cases, applications in memory 510 stored on and accessed via a non-transitory computer readable medium, such as a hard disk drive or other storage medium. Additionally, applications can be in the form of electronic signals modulated in accordance with the application and data communication technology when accessed via a network interface.

In some cases, the software 515 may not be directly executable by the processor but may cause a computer (e.g., when compiled and executed) to perform functions described herein. The processor 520 may include an intelligent hardware device, (e.g., a central processing unit (CPU), a microcontroller, an application specific integrated circuit (ASIC), etc.)

The transceiver 525 may communicate bi-directionally, via one or more antennas, wired, or wireless links, with one or more networks, as described above. For example, the transceiver 525 may communicate bi-directionally with one or more local computing device 115-a, one or more sensors 110-b, remote computing device 140-a, and/or remote server 135-a, which may be an example of the remote server of FIG. 1. This bi-directional communication may be direct (e.g., apparatus 305-b communicating directly with remote computing device 140-a) or indirect (e.g., apparatus 305-b communicating indirectly with remote server 135-a through remote computing device 140-a). The transceiver 525 may also include a modem to modulate the packets and provide the modulated packets to the antennas for transmission, and to demodulate packets received from the antennas.

In some embodiments, an element of apparatus 305-b (e.g., transceiver 525) may provide a direct connection to a remote server 135-a via a direct network link to the Internet via a POP (point of presence). In some embodiments, one element of DEV#-a may provide a connection using wireless techniques, including digital cellular telephone connection, Cellular Digital Packet Data (CDPD) connection, digital satellite data connection, and/or another connection.

The signals associated with transceiver 525 may include wireless communication signals such as radio frequency, electromagnetics, local area network (LAN), wide area network (WAN), virtual private network (VPN), wireless network (using 802.11, for example), 345 MHz, Z-WAVE, cellular network (using 3G and/or LTE, for example), and/or other signals. The one or more antennas 530 and/or transceiver module 525 may include or be related to, but are not limited to, WWAN (GSM, CDMA, and WCDMA), WLAN (including BLUETOOTH and Wi-Fi), WMAN (WiMAX), antennas for mobile communications, antennas for Wireless Personal Area Network (WPAN) applications (including RFID and UWB).

In some cases, the control device may include one or more antenna 530, which may be capable of concurrently transmitting or receiving multiple transmissions. In some embodiments, each antenna 530 may receive signals or information specific and/or exclusive to itself. In other embodiments, each antenna 530 may receive signals or information not specific or exclusive to itself.

In some embodiments, the wireless broadcasting module 535 may broadcast the detected input at the doorbell wirelessly to the one or more alert components associated with the security and/or automation system. The one or more alert components may include an audio device, such as an external speaker system, an external display device such as a display screen, and/or an user interface 545 (e.g., remote control device interfaced with the wireless broadcasting module 535 directly and/or through an I/O controller module 540).

Figure 6:
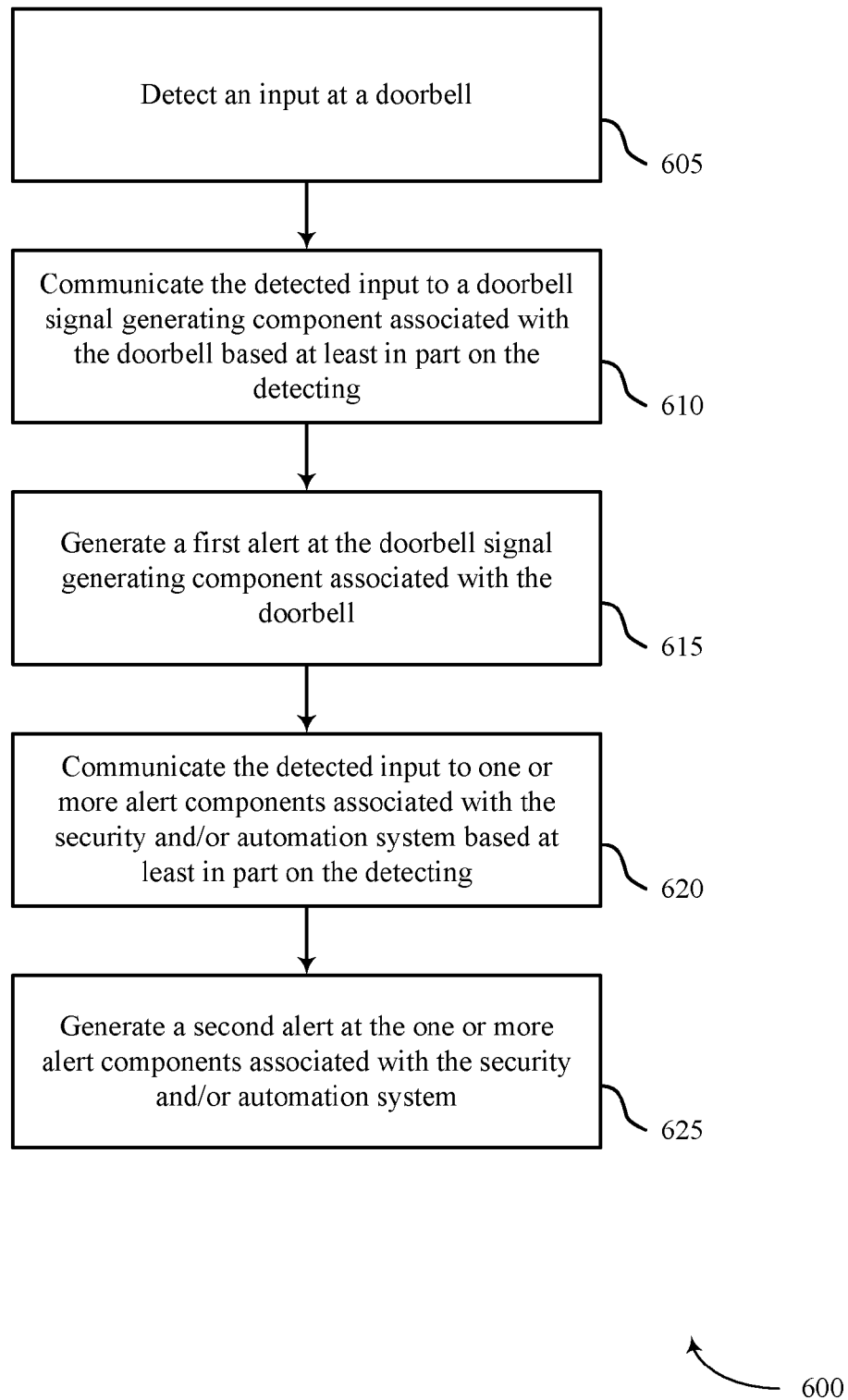
FIGS. 6 and 7 illustrate methods for extending a doorbell chime in accordance with aspects of the present disclosure.

FIG. 6 shows a flowchart illustrating a method 600 for extending a doorbell chime in accordance with various aspects of the present disclosure. The operations of method 600 may be implemented by a device such as an apparatus 305, 305-a, 305-b, or its components, as described with reference to FIGS. 3-5. For example, the operations of method 600 may be performed by the doorbell extension module as described herein. In some examples, the apparatus 305, 305-a, 305-b may execute a set of codes to control the functional elements of the device to perform the functions described below. Additionally or alternatively, the apparatus 305, 305-a, 305-b may perform aspects the functions described below using special-purpose hardware. It should be noted that the method 600 is just one implementation and that the operations of the method 600 may be rearranged or otherwise modified such that other implementations are possible.

At block 605, the apparatus 305, 305-a, 305-b may detect an input at a doorbell as described above with reference to FIGS. 2-5. In certain examples, the operations of block 605 may be performed by the input detecting module 405 as described with reference to FIG. 4.

At block 610, the apparatus 305, 305-a, 305-b may communicate the detected input to a doorbell signal generating component associated with the doorbell based on the detecting as described above with reference to FIGS. 2-5. In certain examples, the operations of block 610 may be performed by the communication module 410 as described with reference to FIG. 4.

At block 615, the apparatus 305, 305-a, 305-b may generate a first alert at the doorbell signal generating component associated with the doorbell as described above with reference to FIGS. 2-5. In certain examples, the operations of block 615 may be performed by the alert generation module 415 as described with reference to FIG. 4.

At block 620, the apparatus 305, 305-a, 305-b may communicate the detected input to one or more alert components associated with the security and/or automation system based on the detecting as described above with reference to FIGS. 2-5. In certain examples, the operations of block 620 may be performed by the communication module 410 as described with reference to FIG. 4.

At block 625, the apparatus 305, 305-a, 305-b may generate a second alert at the one or more alert components associated with the security and/or automation system as described above with reference to FIGS. 2-5. In certain examples, the operations of block 625 may be performed by the alert generation module 415 as described with reference to FIG. 4.

Figure 7:
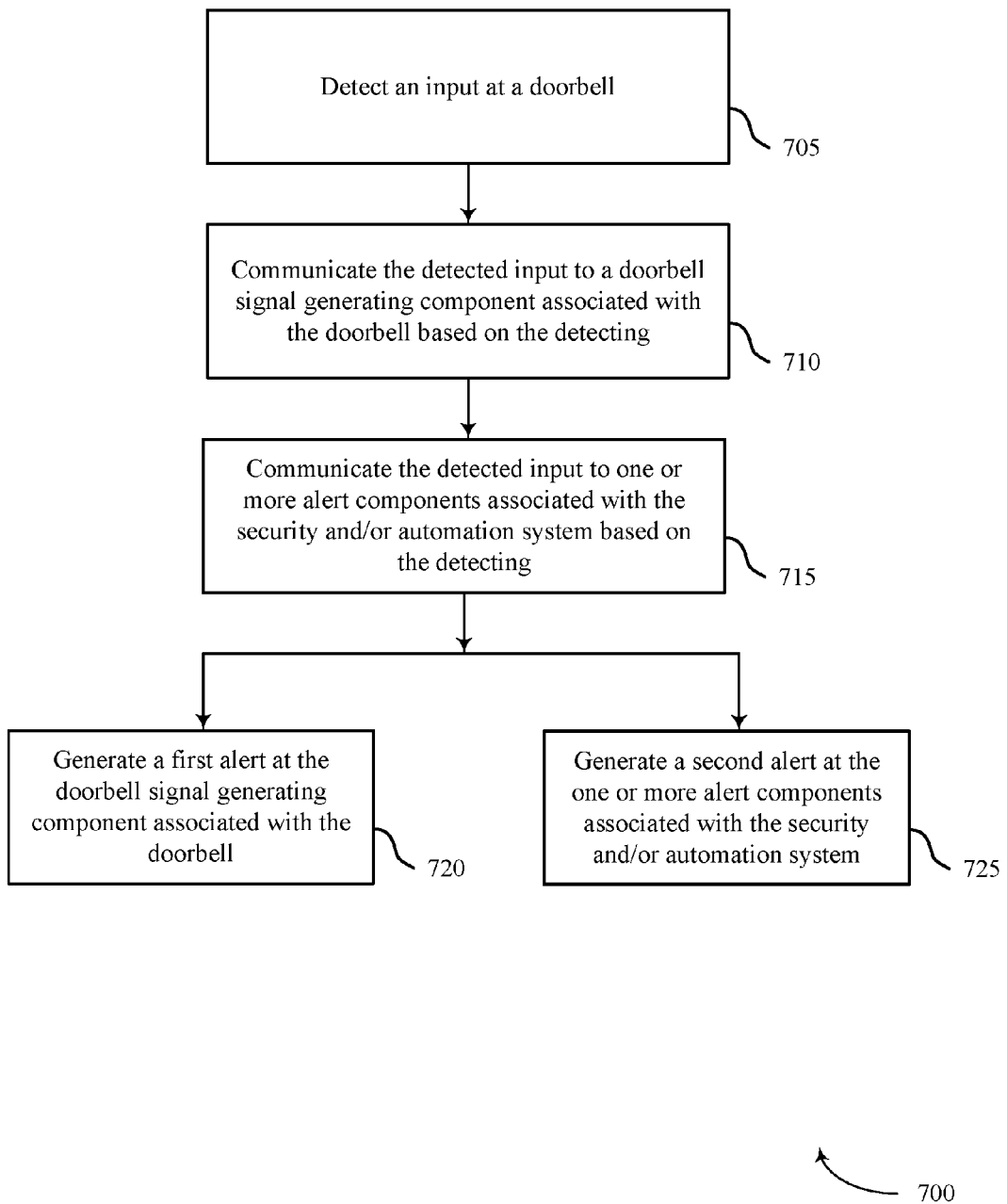

FIG. 7 shows a flowchart illustrating a method 700 for extending a doorbell chime in accordance with various aspects of the present disclosure. The operations of method 800 may be implemented by a device such as an apparatus 305, 305-a, 305-b or its components as described with reference to FIGS. 2-5. For example, the operations of method 700 may be performed by the doorbell extension module as described herein. In some examples, the apparatus 305, 305-a, 305-b may execute a set of codes to control the functional elements of the device to perform the functions described below. Additionally or alternatively, the apparatus 305, 305-a, 305-b may perform aspects the functions described below using special-purpose hardware. It should be noted that the method 700 is just one implementation and that the operations of the method 700 may be rearranged or otherwise modified such that other implementations are possible.

At block 705, the apparatus 305, 305-a, 305-b may detect an input at a doorbell as described above with reference to FIGS. 2-5. In certain examples, the operations of block 705 may be performed by the input detecting module 405 as described with reference to FIG. 4.

At block 710, the apparatus 305, 305-a, 305-b may communicate the detected input to a doorbell signal generating component associated with the doorbell based on the detecting as described above with reference to FIGS. 2-5. In certain examples, the operations of block 710 may be performed by the communication module 410 as described with reference to FIG. 4.

At block 715, the apparatus 305, 305-a, 305-b may communicate the detected input to one or more alert components associated with the security and/or automation system based on the detecting as described above with reference to FIGS. 2-5. In certain examples, the operations of block 715 may be performed by the communication module 410 as described with reference to FIG. 4.

At block 720, the apparatus 305, 305-a, 305-b may generate a first alert at the doorbell signal generating component associated with the doorbell as described above with reference to FIGS. 2-5. In certain examples, the operations of block 715 may be performed by the alert generation module 415 as described with reference to FIG. 4.

At block 725, the apparatus 305, 305-a, 305-b may simultaneously generate a second alert at the one or more alert components associated with the security and/or automation system as described above with reference to FIGS. 2-5. In certain examples, the operations of block 725 may be performed by the alert generation module 415 as described with reference to FIG. 4. Thus, the apparatus 305, 305-a, 305-b may generate the first alert and the second alert simultaneously or in series as described above with reference to FIGS. 2-6.

In some examples, aspects from two or more of the methods above may be combined and/or separated. It should be noted that these methods are example implementations, and that the operations may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous" over other examples. The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or,"" when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method of security and/or automation systems comprising:
    detecting an input at a doorbell;
    communicating the detected input to a doorbell signal generating component associated with the doorbell based at least in part on the detecting;
    generating a first alert at the doorbell signal generating component associated with the doorbell;
    communicating the detected input to a control panel of a security and/or automation system associated with a structure;
    detecting an occupancy of one or more areas of the structure based at least in part on the detected input;
    communicating the detected input to one or more alert components associated with the security and/or automation system based at least in part on the detected input and detecting the occupancy of the one or more areas, the one or more alert components positioned in the one or more areas of the structure that are occupied; and
    generating a second alert at the one or more alert components positioned in the one or more areas of the structure that are occupied based at least in part on receiving the detected input.

2. The method of claim 1, further comprising:
    broadcasting the detected input at the doorbell wirelessly to the one or more alert components associated with the security and/or automation system.

3. The method of claim 1, further comprising:
    generating the first alert and the second alert simultaneously or in series.

4. The method of claim 1, wherein the first alert and the second alert each comprise any of a visual alert, or an auditory alert, or a haptic alert, or a combination thereof.

5. The method of claim 1, wherein the one or more component associated with the security and/or automation system comprises any of a control panel, or a camera, or a combination thereof.

6. The method of claim 1, further comprising:
    receiving a preference indicating particular areas of the structure where the second alert should be generated, wherein communicating the detected input to one or more alert components is based at least in part on the received preference.

7. An apparatus for security and/or automation systems, comprising:
    a processor;
    memory in electronic communication with the processor; and
    instructions stored in the memory and operable, when executed by the processor, to cause the apparatus to:
    detect an input at a doorbell;
    communicate the detected input to a doorbell signal generating component associated with the doorbell based at least in part on the detecting;
    generate a first alert at the doorbell signal generating component associated with the doorbell;
    communicate the detected input to a control panel of a security and/or automation system associated with a structure;
    detect an occupancy of one or more areas of the structure based at least in part on the detected input;

communicate the detected input to one or more alert components associated with the security and/or automation system based at least in part on the detected input and detecting the occupancy of the one or more areas, the one or more alert components positioned in the one or more areas of the structure that are occupied; and generate a second alert at the one or more alert components positioned in the one or more areas of the structure that are occupied based at least in part on receiving the detected input.

8. The apparatus of claim 7, wherein the instructions are operable to cause the processor to:

broadcast the detected input at the doorbell wirelessly to the one or more alert components associated with the security and/or automation system.

9. The apparatus of claim 7, wherein the instructions are operable to cause the processor to:

generate the first alert and the second alert simultaneously or in series.

10. The apparatus of claim 7, wherein the first alert and the second alert each comprise any of a visual alert, or an auditory alert, or a haptic alert, or a combination thereof.

11. The apparatus of claim 7, wherein the one or more component associated with the security and/or automation system comprises any of a control panel, or a camera, or a combination thereof.

12. A non-transitory computer-readable medium storing code for security and/or automation systems, the code comprising instructions executable to:

detect an input at a doorbell;

communicate the detected input to a doorbell signal generating component associated with the doorbell based at least in part on the detecting;

generate a first alert at the doorbell signal generating component associated with the doorbell;

communicate the detected input to a control panel of a security and/or automation system associated with a structure;

detect an occupancy of one or more areas of the structure based at least in part on the detected input;

communicate the detected input to one or more alert components associated with the security and/or automation system based at least in part on the detected input and detecting the occupancy of the one or more areas, the one or more alert components positioned in the one or more areas of the structure that are occupied; and generate a second alert at the one or more alert components positioned in the one or more areas of the structure that are occupied based at least in part on receiving the detected input.

13. The non-transitory computer-readable medium of claim 12, wherein the instructions are executable to:

broadcast the detected input at the doorbell wirelessly to the one or more alert components associated with the security and/or automation system.

14. The non-transitory computer-readable medium of claim 12, wherein the instructions are executable to:

generate the first alert and the second alert simultaneously or in series.

15. The non-transitory computer-readable medium of claim 12, wherein the first alert and the second alert each comprise any of a visual alert, or an auditory alert, or a haptic alert, or a combination thereof.

16. The non-transitory computer-readable medium of claim 12, wherein the one or more component associated with the security and/or automation system comprises any of a control panel, or a camera, or a combination thereof.

\* \* \* \* \*